US006177783B1

(12) United States Patent
Donohue

(10) Patent No.: US 6,177,783 B1
(45) Date of Patent: Jan. 23, 2001

(54) CURRENT BALANCING FOR VOLTAGE REGULATOR HAVING INPUTS FROM MULTIPLE POWER SUPPLIES

(75) Inventor: John E. Donohue, Ridgefield, CT (US)

(73) Assignee: ADC Telecommunications, Inc., Minnetonka, MN (US)

( * ) Notice: Under 35 U.S.C. 154(b), the term of this patent shall be extended for 0 days.

(21) Appl. No.: 09/394,149

(22) Filed: Sep. 13, 1999

(51) Int. Cl.[7] .............................. G05F 1/40; G05F 1/44; H02M 7/00
(52) U.S. Cl. ........................... 323/272; 323/282; 363/65; 363/79
(58) Field of Search ............................... 323/272, 282, 323/269; 363/65, 78, 79

(56) References Cited

U.S. PATENT DOCUMENTS

| 4,257,090 | * | 3/1981 | Kroger et al. ........................ 363/65 |
| 4,618,779 | * | 10/1986 | Wiscombe ............................. 323/909 |
| 4,766,364 | * | 8/1988 | Biamonte et al. .................... 323/272 |
| 5,122,726 | * | 6/1992 | Elliot et al. ........................... 323/272 |
| 5,338,994 | * | 8/1994 | Lezan et al. ............................ 363/70 |
| 5,428,523 | * | 6/1995 | McDonnal .............................. 363/71 |
| 5,428,524 | * | 6/1995 | Massie .................................... 363/79 |
| 5,521,809 | * | 5/1996 | Ashley et al. ......................... 363/71 |
| 5,724,237 | * | 3/1998 | Hunter .................................... 363/65 |
| 5,982,677 | * | 11/1999 | Fontana et al. ...................... 323/313 |
| 6,014,322 | * | 1/2000 | Higashi et al. ........................ 363/65 |

* cited by examiner

Primary Examiner—Peter S. Wong
Assistant Examiner—Bao Q. Vu
(74) Attorney, Agent, or Firm—Fogg Slifer & Polglaze, P.A.

(57) ABSTRACT

A voltage regulator is provided. The voltage regulator comprises a first voltage-controlled current regulator having a first power input and at least one additional voltage-controlled current regulator having at least one other power input. The first and the at least one additional voltage-controlled current regulators have first and second current paths, respectively, and a common output node. The voltage regulator also includes an error amplifier that is responsive to the common output node. The error amplifier further has an output. The output of the error amplifier provides a common feedback signal to the first and the at least one additional voltage-controlled current regulators so as to establish selected currents drawn by the first and the at least one other power inputs and provided to the common output node.

34 Claims, 6 Drawing Sheets

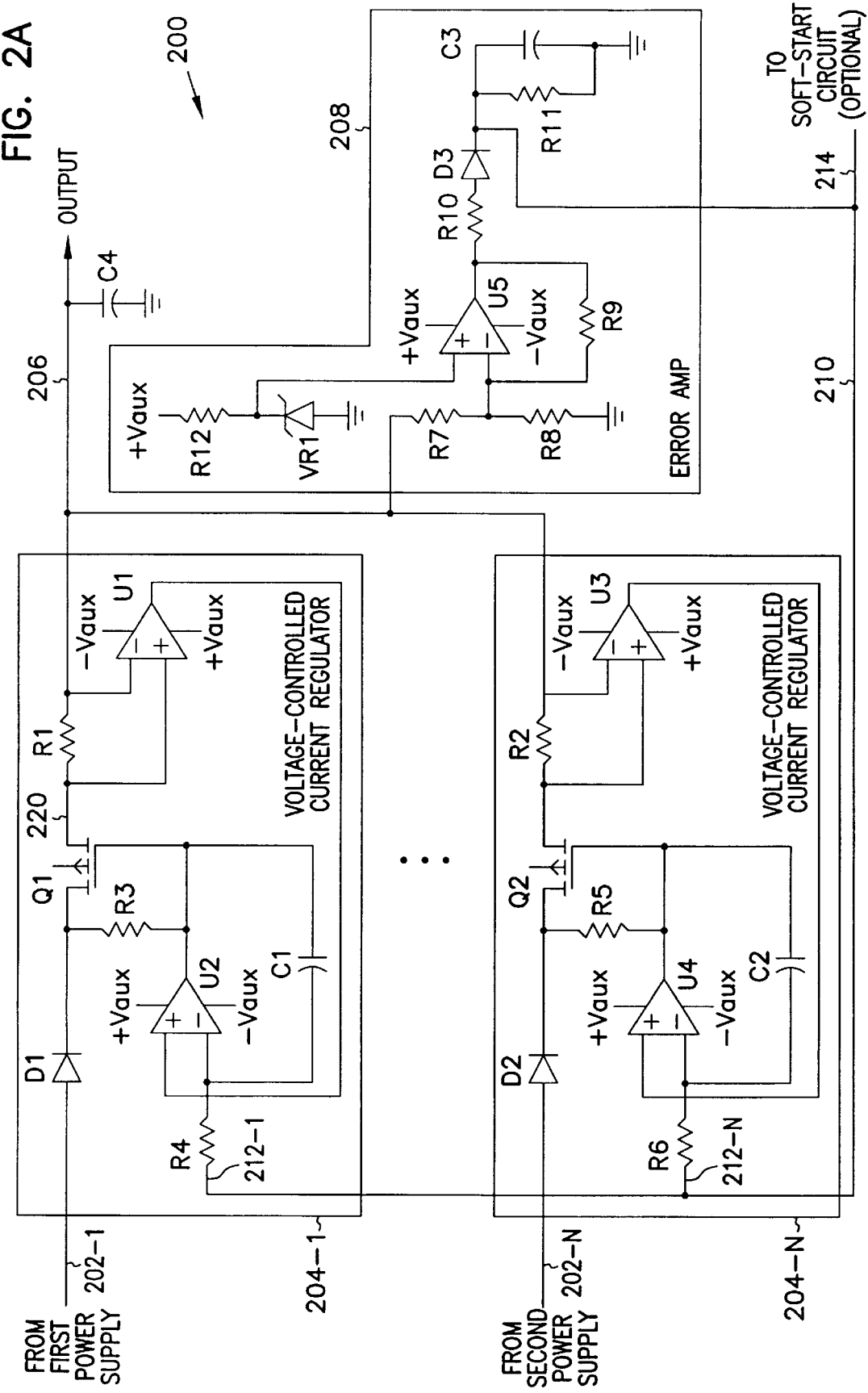

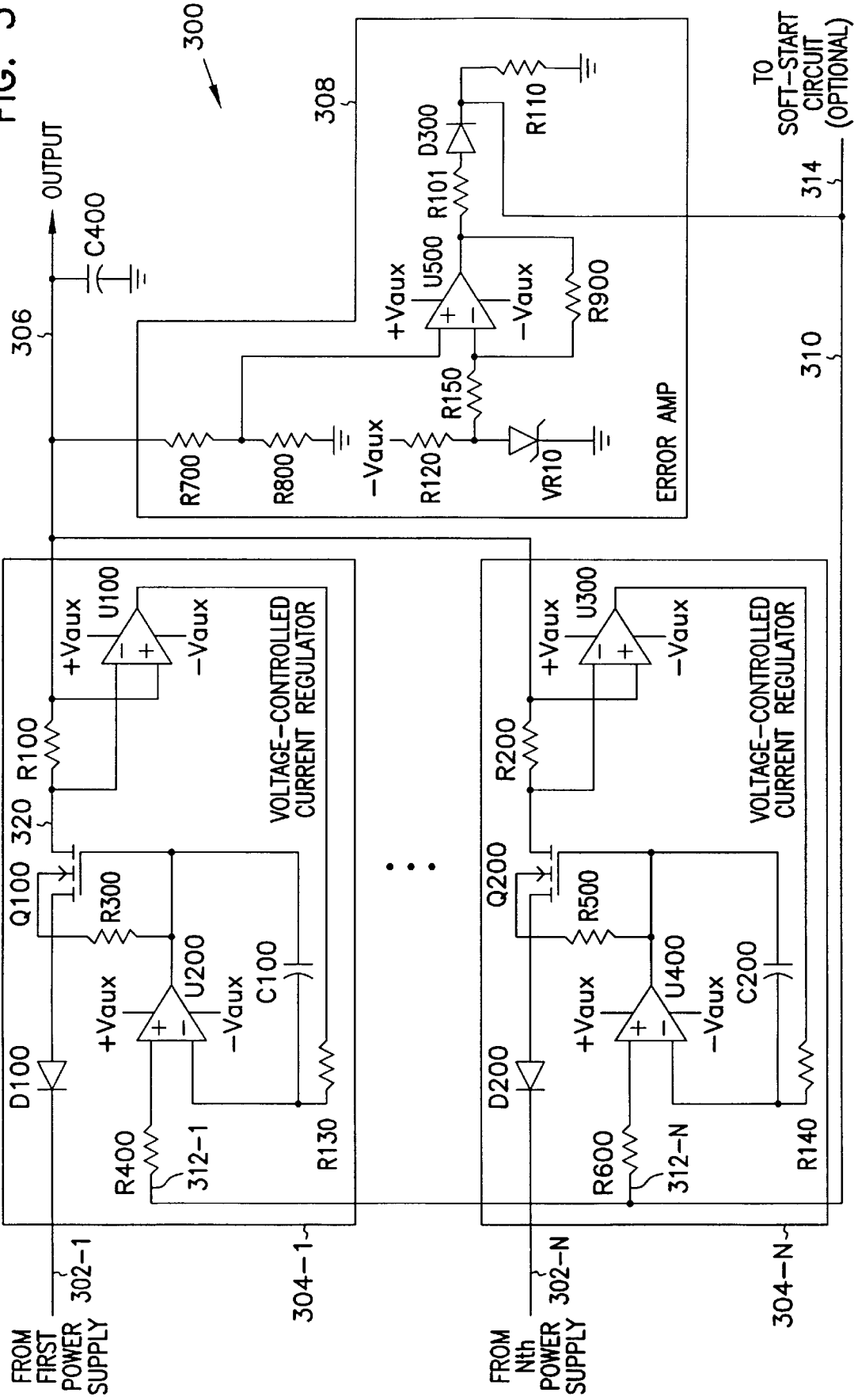

CURRENT BALANCING FOR VOLTAGE REGULATOR HAVING INPUTS FROM MULTIPLE POWER SUPPLIES

TECHNICAL FIELD OF THE INVENTION

The present invention relates generally to the field of telecommunications and, in particular, to an arrangement for current balancing for a voltage regulator having inputs from multiple power supplies.

BACKGROUND

Power supplies are typically used with electronic circuits. These devices provide the electronic circuits with voltage and current needed for proper operation. In most systems, many circuit packs or modules are powered from a common power supply. The circuit packs or modules each include a functional circuit that performs a specific function within the system. These functional circuits draw current from the power supply in order to perform their specified function.

Conventionally, a power supply can provide at most a specified amount of current. Unfortunately, as a system evolves over time, its current and voltage requirements might also change. In some instances, this may mean that the power supplies used in prior generations of the system may not be able to provide sufficient current for later generations of the system. Thus, it is often necessary when modifying a system to replace existing power supplies with new power supplies that can deliver sufficient current for the new system. This increases the costs associated with upgrading an electronic system.

For the reasons stated above, and for other reasons stated below which will become apparent to those skilled in the art upon reading and understanding the present specification, there is a need in the art for a method for providing sufficient current from a power supply when system requirements change.

SUMMARY

The above mentioned problems with telecommunications systems and other problems are addressed by the present invention and will be understood by reading and studying the following specification. A current balancing arrangement is described which uses a single control signal to regulate current flow in a voltage regulator for a plurality of power supplies. By regulating the currents with the same control signal, the total current flow for the regulator can be balanced between the plurality of power supplies in any selected ratio.

BRIEF DESCRIPTION OF THE DRAWINGS

FIG. 2A is a schematic diagram of one embodiment of a voltage regulator that balances current drawn from multiple power supplies according to the teachings of the present invention.

FIG. 3 is a schematic diagram of another embodiment of a voltage regulator that balances current for multiple power supplies according to the teachings of the present invention.

DETAILED DESCRIPTION

The following detailed description refers to the accompanying drawings which form a part of the specification. The drawings show, and the detailed description describes, by way of illustration specific illustrative embodiments in which the invention may be practiced. These embodiments are described in sufficient detail to enable those skilled in the art to practice the invention. Other embodiments may be used and logical, mechanical and electrical changes may be made without departing from the scope of the present invention. The following detailed description is, therefore, not to be taken in a limiting sense.

I. Overview

Embodiments of the present invention provide circuits that balance the current for a plurality of power supply circuits that provide power to an electronic system. In one embodiment, a voltage regulator circuit draws current equally from the plurality of power supply circuits. In other embodiments, the voltage regulator draws current from each power supply according to a selected ratio. Advantageously, a voltage regulator constructed according to the teachings of the present invention allows existing power supplies to be used in combination to meet current specifications that exceed the capacity of the existing power supplies. Thus, system implementers do not need to restock power supplies when migrating to a new system.

Section II below describes a first embodiment of a voltage regulator that provides balanced current for a plurality of power supplies according to the teachings of the present invention. Essentially, the voltage regulator senses the current for each of the plurality of power supplies and compares the sensed current with a current command signal to determine whether to make adjustments in the current for the power supply. Section III describes another embodiment of a voltage regulator for providing a positive, regulated voltage. Section IV describes another embodiment of a voltage regulator for providing a negative, regulated voltage.

Section V provides a circuit that controls the rate of change of current for the voltage regulator. Advantageously, this circuit allows a circuit pack including the voltage regulator to be "hot plugged" into an electronic system without a current rush that could adversely affect the functional circuits of the circuit pack.

II. Embodiment of a Voltage Regulator with Balanced Current Draw

Figure 1:
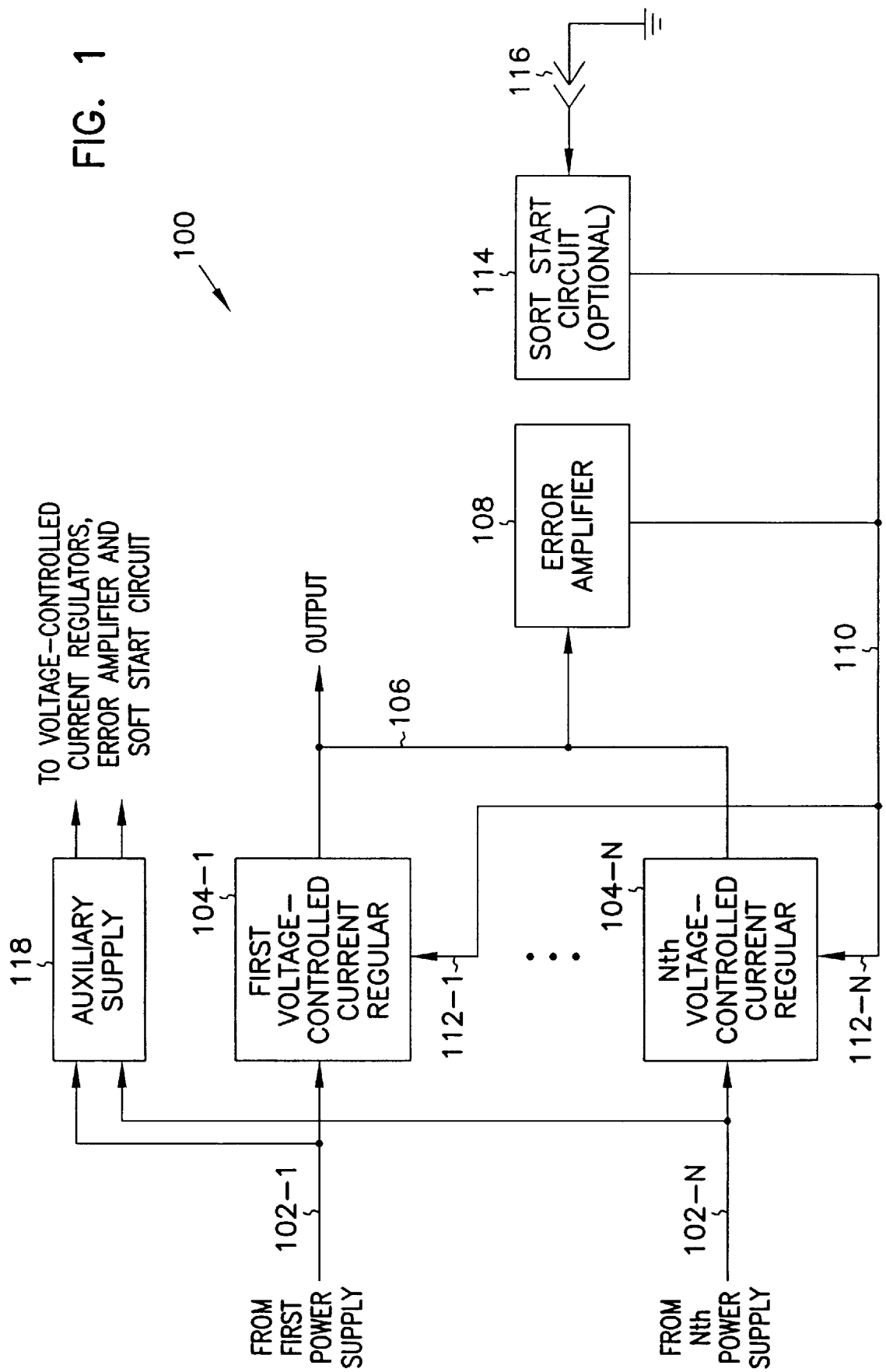
FIG. 1 is a block diagram of an embodiment of a voltage regulator that balances current for multiple power supplies according to the teachings of the present invention.

FIG. 1 is a block diagram of an embodiment of a voltage regulator, indicated generally at 100, that balances current for multiple power supplies according to the teachings of the present invention. Voltage regulator 100 includes power supply inputs 102-1, ..., 102-N that are coupleable to power supplies (not shown). These power supplies can be positive power supplies or negative power supplies. Inputs 102-11, ..., 102-N are coupled to voltage-controlled current regulators 104-1, ..., 104-N. The outputs of regulators 104-1, ..., 104-N are coupled to common output node 106 to provide the OUTPUT for voltage regulator 100.

Common node 106 is also coupled to error amplifier 108 to provide feedback control of the current for the power supplies by voltage-controlled current regulators 104-1, ..., 104-N. A current command signal is provided over feedback path 110 to feedback inputs 112-1, ..., 112-N of current regulators 104-1, ..., 104-N. Error amplifier 108 compares the combined output of current regulators 104-1, ..., 104-N at common node 106 to a reference and varies the current command signal on feedback path 110 to assure a selected balance in current for each of the power supplies. For example, the current command signal may control the current regulators to draw an equal current level from each power supply. Alternatively, the current supplied from each power supply can be set according to a selected ratio.

In one embodiment, voltage regulator 100 also includes soft-start circuit 114. Soft-start circuit 114 is coupled to feedback path 110 to provide a slow ramp-up of the feedback signal to current regulators 104-1, ..., 104-N to limit in-rush surge current. In one embodiment, soft-start circuit 114 includes "last make" pin 116 that provides a connection for soft-start circuit 114 to ground (or a power supply voltage) on a backplane of an electronic system. Last make pins 116 are shorter than pins used to connect to the power supplies. Upon insertion, soft-start circuit 114 inhibits current draw until last make pin 116 connects to ground. At that point, soft-start circuit 114 provides a gradually ramping voltage at its output. This allows the current output at common node 106 to slowly ramp up upon insertion thereby avoiding potentially damaging large current surges and ensures that associated circuitry is not powered until fully inserted into the backplane.

Regulator 100 also includes auxiliary supply 118. Auxiliary supply 118 provides current to the circuitry of voltage-controlled current regulators 104-1, ..., 104-N, error amplifier 108, and soft-start circuit 114. These circuits draw on average only a few millipedes and thus do not add greatly to the current drawn from the power supplies.

In one embodiment, voltage regulator 100 receives inputs from five power supplies. In this embodiment, voltage regulator 100 can provide sufficient current by drawing current from any two of the power supplies. Thus, voltage regulator 100 operates properly even with the failure of three power supplies. Further, when more than two power supplies are active, voltage regulator 100 adjusts the current drawn from each to balance the total current provided at its output at an acceptable level.

In operation, voltage regulator 100 provides balanced current for a plurality of power supplies at inputs 102-1, ..., 102-N. In one embodiment, voltage regulator 100 draws current from the power supplies. It is understood that in other embodiments, voltage regulator 100 may sink current when coupled to regulate negative power supplies. By way of example, the operation of FIG. 1 that follows is described in terms of positive power supply voltages with regulator 100 drawing current from the power supplies.

Initially at start-up, soft-start circuit 114 holds the current command signal provided to voltage-controlled current regulators 104-1, ..., 104-N at a voltage level that prevents current from being drawn by voltage regulator 100. Gradually, the softstart circuit 114 ramps-up its output voltage, thus allowing the current command signal on feedback path 110 to gradually increase. This allows each of the voltage-controlled current regulators 104-1, ..., 104-N to gradually increase the current it draws from a power supply. Eventually, soft-start circuit 114 reaches a voltage level that ceases to effect the control of feedback path 110.

After start-up, error amplifier 108 provides feedback to voltage-controlled current regulators 104-1, ..., 104-N to keep the current drawn from the power supplies at levels according to a selected ratio. When the voltage at common output node 106 decreases or increases, error amplifier 108 adjusts the current command signal on feedback path 110 up or down, respectively, to compensate.

III. Another Embodiment for Positive Voltage Supplies

FIG. 2A is a schematic diagram of one embodiment of a voltage regulator, indicated generally at 200, that balances current drawn from multiple power supplies according to the teachings of the present invention. Voltage regulator 200 includes power supply inputs 202-1, ..., 202-N that are coupleable to power supplies that provide positive voltages. Inputs 202-1, ..., 202-N are coupled to voltage-controlled current regulators 204-1, ..., 204-N. The outputs of regulators 204-1, ..., 204-N are coupled to common output node 206 to provide the OUTPUT for voltage regulator 200.

Common node 206 is also coupled to error amplifier 208 to provide feedback control of the current drawn from the power supplies by voltage-controlled current regulators 204-1, ..., 204-N. A current command signal is provided over feedback path 210 to feedback inputs 212-1, ..., 212-N of current regulators 204-1, ..., 204-N. Error amplifier 208 compares the combined output of current regulators 204-1, ..., 204-N at common node 206 to a reference and varies the current command signal on feedback path 210 to assure a selected balance in current draw from each of the power supplies. For example, the current command signal may control the current regulators to draw an equal current level from each power supply. Alternatively, the current supplied from each power supply can be set according to a selected ratio.

Voltage-controlled current regulators 204-1, ..., 204-N are each constructed in a similar manner. For simplicity, only voltage-controlled current regulator 204-1 is described in detail. Regulator 204-1 includes current path 220 between power supply input 202-1 and common node 206. Diode D1, transistor Q1 and resistor R1 are coupled in series in current path 220.

Diode D1 is coupled to prevent reverse current flow in the event of power supply failure. Transistor Q1 establishes the current in current path 202. The gate of transistor Q1 is coupled to receive a feedback signal that adjusts the current in transistor Q1 due to fluctuations in the output of voltage regulator 200.

Resistor R1 monitors the current in main current path 202. Differential amplifier U1 has inverting and non-inverting inputs that are coupled across resistor R1 to sense the current passing through resistor R1.

Regulator 204-1 also includes operational amplifier U2 that essentially compares the current sensed in resistor R1 with a current command signal received over feedback path 210 to determine the appropriate voltage to apply to transistor Q1 to control the current in current path 220. The output of operational amplifier U2 is coupled to a gate of transistor Q1. Resistor R3 is also provided between the output of operational amplifier U2 and a drain of transistor Q1. Operational amplifier U2 includes an inverting input and a non-inverting input. The non-inverting input is coupled to the output of differential amplifier U1 to receive the sensed current level. The inverting input of operational amplifier U2 is coupled to feedback path 210 through resistor R4 to receive the current command signal.

Capacitor C1 is coupled between the non-inverting input and the output of operational amplifier U2. Capacitor C1 provides necessary frequency compensation to stabilize the feedback loop of regulator 200.

Error amplifier 208 generates a current command signal that is applied to each of the voltage-controlled current regulators 204-1, ..., 204-N. Error amplifier 208 includes operational amplifier U5. Operational amplifier U5 compares the output of regulator 200 at common node 206 with a reference voltage and adjusts the current command signal accordingly.

Operational amplifier U5 includes an inverting input that receives a voltage from common node 206. This voltage is divided down by resistors R7 and R8. Operational amplifier U5 also receives the reference voltage at its non-inverting input. This reference voltage is established by diode VR1 and resistor R12. Resistor R9 is coupled between the output and the inverting input of operational amplifier U5. Further, resistor R10 and diode D3 are coupled in series between the output of operational amplifier U5 and feedback path 210. Resistor R11 and capacitor C3 are coupled in parallel between current path 210 and ground. Diode D3 assures that the current command signal is always positive. Further, Resistors R10 and R11 and capacitor C3 provide frequency compensation to stabilize the feedback loop of voltage regulator 200.

Voltage regulator 200 further includes capacitor C4 that is coupled to common node 206 to provide for regulation on the output of regulator 200.

In one embodiment, voltage regulator 200 also includes input 214 for an optional soft-start circuit such as soft-start circuit 400 of FIG. 4, described in more detail below.

Figure 2B:
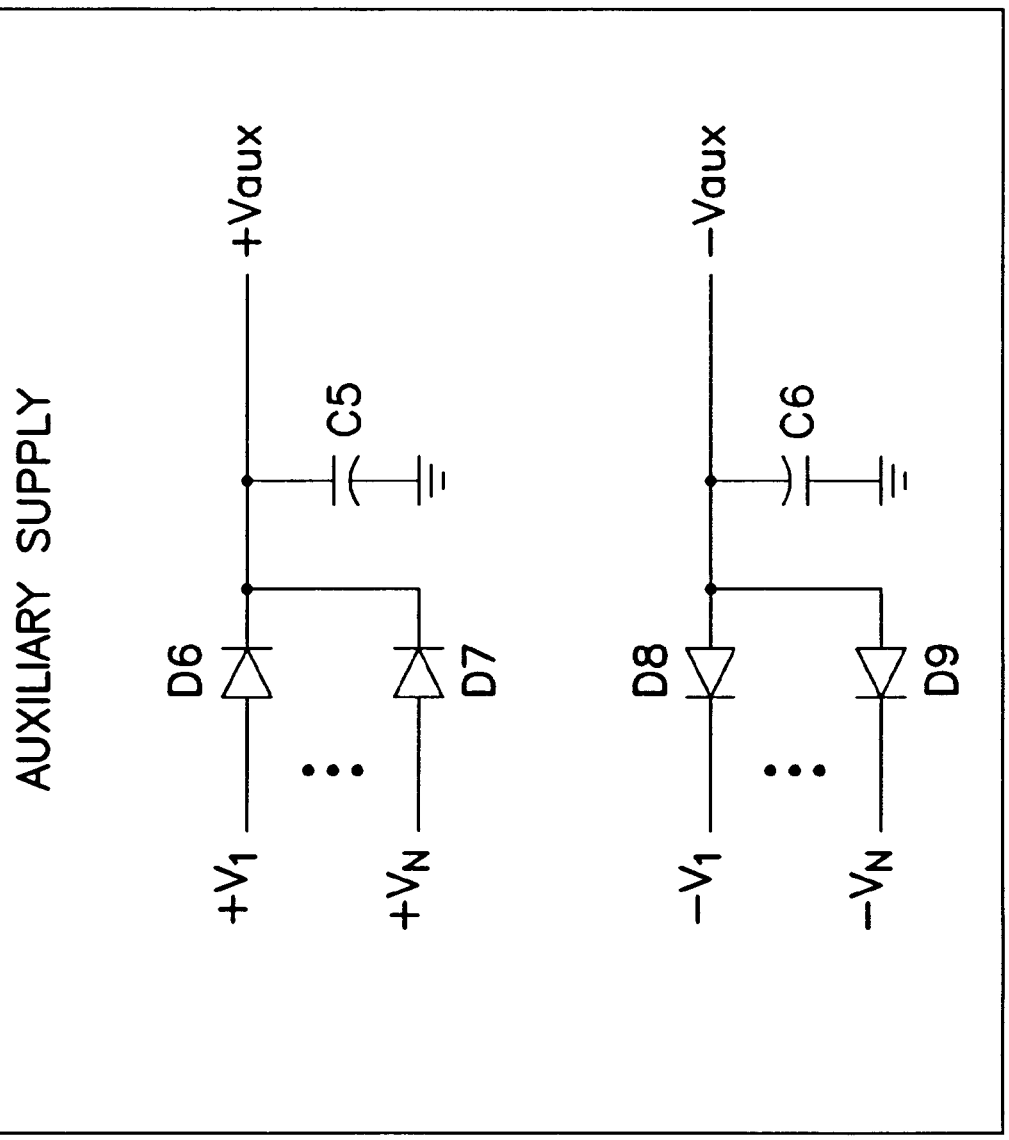
FIG. 2B is a schematic diagram of an embodiment of an auxiliary power supply for the voltage regulator of FIG. 2A.

In one embodiment, regulator 200 includes auxiliary supply 218 of FIG. 2B. Auxiliary supply 218 provides current to the circuitry of voltage-controlled current regulators 204-1, ..., 204-N, error amplifier 208, and, when present, a soft-start circuit coupled to input node 214. For example, the outputs of auxiliary supply 218, labeled +Vaux and −Vaux are provided to differential amplifiers U1 and U3, and operational amplifiers U2, U4, and U5. These circuits draw on average only a few millipedes and thus do not add greatly to the current drawn from the power supplies. In the embodiment shown in FIG. 2B, auxiliary supply 218 receives inputs from a number of unregulated power supplies. Positive inputs, labeled $+V_1, \ldots, +V_N$, are coupled through diodes D6 and D7 to output node +Vaux. Similarly, negative inputs, labeled $-V_1, \ldots, -V_N$ are coupled through diodes D8 and D9 to output node −Vaux. Capacitors C5 and C6 are provided to stabilize the outputs +Vaux and −Vaux.

In one embodiment, voltage regulator 200 receives inputs from five power supplies. In this embodiment, voltage regulator 200 can provide sufficient current by drawing current from any two of the power supplies. Thus, voltage regulator 200 operates properly even with the failure of three power supplies. Further, when more than two power supplies are active, voltage regulator 200 adjusts the current drawn from each to balance the total current provided at its output at an acceptable level.

In operation, voltage regulator 200 provides balanced current draw from a plurality of power supplies at inputs 202-1, ..., 202-N. Transistors Q1 and Q2 establish the current in their respective current paths. Resistors R1 and R2 sense the currents and provide these values to operational amplifiers U2 and U4, respectively, for use in controlling the current output at common node 206.

Error amplifier 208 provides feedback to voltage-controlled current regulators 204-1, ..., 204-N to keep the current drawn from the power supplies at selected levels according to a selected ratio. When the voltage at common output node 206 increases, for example, operational amplifier U5 drives the current command signal lower. This signal is applied to operational amplifiers U2 and U4 and compared to the sensed current from differential amplifiers U1 and U3. Operational amplifiers U2 and U4 drive the voltage on the gates of transistors Q1 and Q2 higher so as to reduce the current in the current paths of voltage-controlled current regulators 204-1, ..., 204-N so as to bring the current output of regulator 200 back to the selected level to compensate.

IV. Another Embodiment for Negative Voltage Supplies

FIG. 3 is a schematic diagram of one embodiment of a voltage regulator, indicated generally at 300, that balances current for multiple power supplies according to the teachings of the present invention. Voltage regulator 300 includes power supply inputs 302-1, ..., 302-N that are coupleable to power supplies that provide negative voltages. Inputs 302-1, ..., 302-N are coupled to voltage-controlled current regulators 304-1, ..., 304-N. The outputs of regulators 304-1, ..., 304-N are coupled to common output node 306 to provide the OUTPUT for voltage regulator 300.

Common node 306 is also coupled to error amplifier 308 to provide feedback control of the current for voltage-controlled current regulators 304-1, ..., 304-N. A current command signal is provided over feedback path 310 to feedback inputs 312-1, ..., 312-N of current regulators 304-1, ..., 304-N. Error amplifier 308 compares the combined output of current regulators 304-1, ..., 304-N at common node 306 to a reference and varies the current command signal on feedback path 310 to assure a selected balance in current for the voltage-controlled current regulators 304-1, ..., 304-N. For example, the current command signal may control the current regulators to pass equal current levels. Alternatively, the current command signal may control the current regulators to pass different currents according to selected ratios.

Voltage-controlled current regulators 304-1, ..., 304-N are each constructed in a similar manner. For simplicity, only voltage-controlled current regulator 304-1 is described in detail. Regulator 304-1 includes current path 320 between power supply input 302-1 and common node 306. Diode D100, transistor Q100 and resistor R100 are coupled in series in current path 320.

Diode D100 is coupled to prevent reverse current flow in the event of power supply failure.

Transistor Q100 establishes the current in current path 302. The gate of transistor Q100 is coupled to receive a feedback signal that adjusts the current in transistor Q100 due to fluctuations in the output of voltage regulator 300.

Resistor R100 monitors the current in main current path 302. Differential amplifier U100 has inverting and non-inverting inputs that are coupled across resistor R100 to sense the current passing through resistor R100.

Regulator 304-1 also includes operational amplifier U200 that essentially compares the current sensed in resistor R100 with a current command signal received over feedback path 310 to determine the appropriate voltage to apply to transistor Q100 to control the current in current path 320. The output of operational amplifier U200 is coupled to a gate of transistor Q100. Resistor R300 is also provided between the output of operational amplifier U2 and a body contact for transistor Q100. Operational amplifier U200 includes an inverting input and a non-inverting input. The inverting input is coupled to the output of differential amplifier U100 to receive the sensed current level. The non-inverting input of operational amplifier U200 is coupled to feedback path 310 through resistor R400 to receive the current command signal.

Capacitor C100 is coupled between the inverting input and the output of operational amplifier U200. Capacitor C100 provides necessary frequency compensation to stabilize the feedback loop of regulator 300.

Error amplifier 308 generates a current command signal that is applied to each of the voltage-controlled current regulators 304-1, ..., 304-N. Error amplifier 308 includes operational amplifier U500. Operational amplifier U500 compares the output of regulator 300 at common node 306 with a reference voltage and adjusts the current command signal accordingly.

Operational amplifier U500 includes a non-inverting input that receives a voltage from common node 306. This voltage is divided down by resistors R700 and R800. Operational amplifier U500 also receives the reference voltage at its inverting input. This reference voltage is established by diode VR10 and resistor R120 and is provided to the inverting input of operational amplifier U500 through resistor R150. Resistor R900 is coupled between the output and the inverting input of operational amplifier U500. Further, resistor R101 and diode D300 are coupled in series between the output of operational amplifier U500 and feedback path 310. Resistor R110 is coupled between current path 310 and ground. Diode D300 assures that the current command signal is always positive. Further, Resistors R101 and R110 provide frequency compensation to stabilize the feedback loop of voltage regulator 300.

Voltage regulator 300 further includes capacitor C400 that is coupled to common node 306 to provide for regulation on the output of regulator 300.

In one embodiment, voltage regulator 300 also includes input 314 for an optional soft-start circuit such as soft-start circuit 400 of FIG. 4, described in more detail below.

Regulator 300 is coupled to an auxiliary power supply to power the various circuits of voltage-controlled current regulators 304-1, ..., 304-N, and error amplifier 308. For example, auxiliary supply 218 of FIG. 2B can be used to provide auxiliary voltages labeled +Vaux and −Vaux in FIG. 3.

In one embodiment, voltage regulator 300 is coupled to five power supplies. In this embodiment, voltage regulator 300 can properly function with as few as two of the power supplies. Thus, voltage regulator 300 operates properly even with the failure of three power supplies. Further, when more than two power supplies are active, voltage regulator 300 adjusts the current in each of the voltage-controlled current regulators to balance the total current for voltage regulator 300.

In operation, voltage regulator 300 balances current for a plurality of power supplies at inputs 302-1, ..., 302-N. Transistors Q100 and Q200 establish the current in their respective current paths. Resistors R100 and R200 sense the currents and provide these values to operational amplifiers U200 and U400, respectively, for use in controlling the current in voltage regulator 300.

Error amplifier 308 provides feedback to voltage-controlled current regulators 304-1, ..., 304-N to keep the current at selected levels according to a selected ratio. When the voltage at common output node 306 decreases, for example, operational amplifier U500 drives the current command signal lower. This signal is applied to operational amplifiers U200 and U400 and compared to the sensed current from differential amplifiers U100 and U300. Operational amplifiers U200 and U400 drive the voltage on the gates of transistors Q100 and Q200 lower so as to reduce the current in the current paths of voltage-controlled current regulators 304-1, ..., 304-N so as to bring the current output of regulator 300 back to the selected level to compensate.

V. Embodiment of a Soft-Start Circuit

Figure 4:
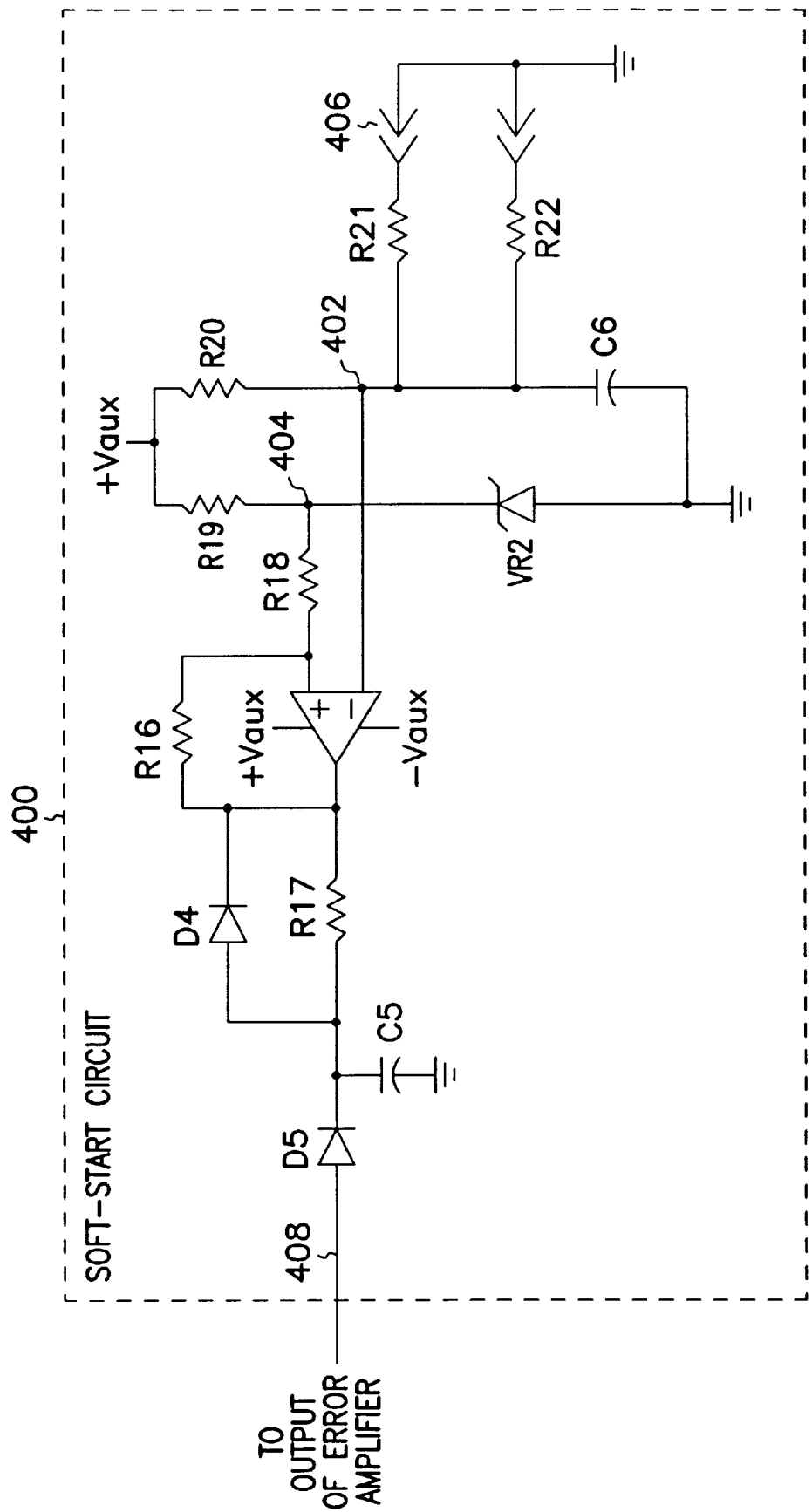
FIG. 4 is a schematic diagram of a soft-start circuit according to the teachings of the present invention.

FIG. 4 is a schematic diagram of a soft-start circuit, indicated generally at 400, according to the teachings of the present invention. Soft-start circuit 400 provides an output signal that gradually increases at start-up, power-on or under external control. Start-up circuit 400 can be used in conjunction with voltage regulators 100, 200 or 300, for example, to control the gradual increase of the current command signal on feedback paths 110, 210, and 310, respectively. Advantageously, soft-start circuit 400 allows these current command signals to increase gradually over time to prevent potentially damaging current surges.

Soft-start circuit 400 includes operational amplifier U6 that functions as a comparator. Operational amplifier U6 essentially compares a reference voltage with a voltage that decreases after full insertion of soft-start circuit 400. Operational amplifier U6 includes inverting and non-inverting inputs.

The non-inverting input is coupled to the reference voltage established by diode VR2. Diode VR2 is coupled between node 404 and ground. Resistor R18 is coupled between node 404 and the non-inverting input. Resistor R19 is coupled between +Vaux and node 404.

The inverting input of operational amplifier U6 is coupled to the voltage that decreases after full insertion of the soft start circuit 400. The inverting input is coupled to node 402. Capacitor C6 is coupled between node 402 and ground potential. Resistor R20 is coupled between +Vaux and node 402. Further, resistors R21 and R22 are coupled between node 402 and ground potential by last make pins 406. The values for resistors R21 and R22 are chosen such that if either resistor R21 or R22 is not grounded, then the voltage at the inverting input of operational amplifier U6 is higher than the voltage at the non-inverting input of operational amplifier U6. Capacitor C6 discharges through resistors R21 and R22 when last make pins 406 are engaged.

Soft-start circuit 400 also includes resistor R17 and diode D4 coupled in parallel to the output of operational amplifier U6. Resistor R17 is coupled to charge capacitor C5 when the output of operational amplifier U6 increases to a high output. Diode D4 and operational amplifier U6 quickly discharge capacitor C5 if the connection of last make pins 406 are broken.

Soft-start circuit 400 also includes resistor R16 coupled between the noninverting input and the output of operational amplifier U6. Further, diode D5 is coupled to resistor R17 and capacitor C5 such that when the voltage on capacitor C5 reaches a sufficiently high level, diode D5 is reverse biased. In this condition, diode D5 prevents soft-start circuit 400 from effecting the circuitry coupled to its output node 408, e.g., the current command signal of the voltage regulator of FIGS. 1, 2, or 3.

In operation, soft-start circuit 400 allows a current command or similar signal to gradually increase thereby avoiding problems with current surges. Initially, resistors R21 and/or R22 are not connected to ground. In this condition, the voltage at the inverting input of operational amplifier U6 is higher than the voltage at the non-inverting input. Thus, the output of U6 is at a low level. This forces the voltage at node 408 to be maintained at a low level. In the case of voltage regulators 100, 200, and 300, this assures that the voltage-controlled current regulators do not pass any current.

When both pins 406 are connected to ground, the voltage at the non-inverting input decreases according to the time constant established by capacitor C6 and resistors R21 and R22. Eventually, the output of operational amplifier U6 reaches a high voltage level and capacitor C5 is charged through resistor R17. This change in voltage allows the voltage on the current command signal to slowly rise also. Eventually, the voltage on capacitor C5 is greater than the current command signal, thereby reverse biasing diode D5. This effectively isolates soft-start circuit 400.

If either of last make pins 406 disconnects, operational amplifier U6 quickly pulls the voltage at node 408 to ground potential through diodes D4 and D5.

VI. Embodiment of a Circuit Pack

Figure 5:
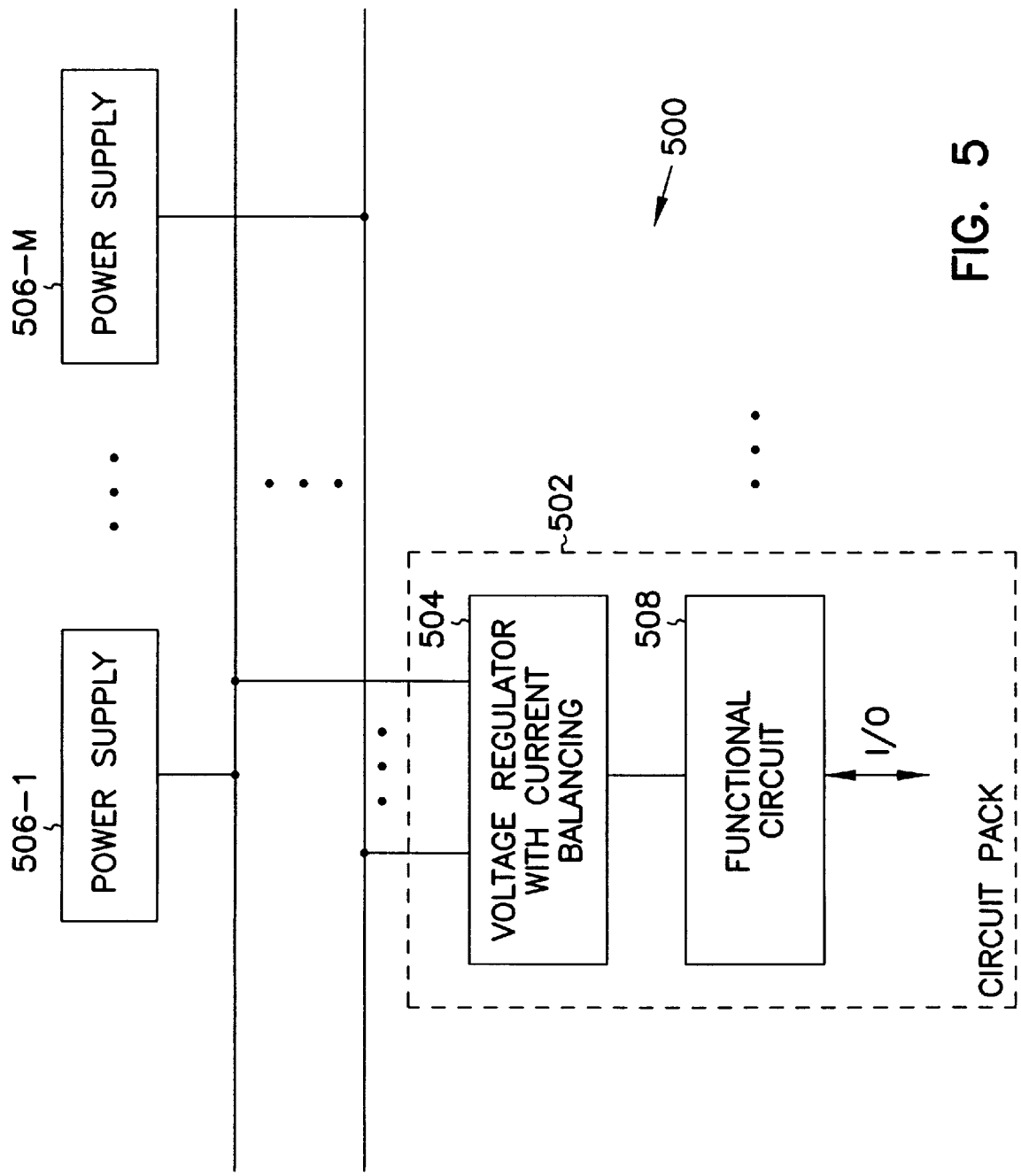
FIG. 5 is a block diagram of an electronic system that includes a circuit pack that balances current from a number of power supplies according to the teachings of the present invention.

FIG. 5 is a block diagram of an electronic system, indicated generally at 500, that includes circuit pack 502 that balances current from a number of power supplies according to the teachings of the present invention. Circuit pack 502 includes voltage regulator with current balancing 504. Voltage regulator 504 may be constructed as described above with respect to FIGS. 1, 2, or 3. Voltage regulator 504 is coupled to a number of power supplies 506-1, . . . , 506-M. Voltage regulator 504 is also coupled to provide a regulated voltage to functional circuit 508. Functional circuit 508 includes, for example, optical or electrical communications circuits, a microprocessor, a memory or other appropriate circuit. Functional circuit 508 includes a number of inputs and outputs (I/O).

VII. Conclusion

A current balancing arrangement has been described which uses a single control signal to regulate current flow in a voltage regulator for a plurality of power supplies. By regulating the currents with the same control signal, the total current flow for the regulator can be balanced between the plurality of power supplies in any selected ratio. Further, soft-start circuitry has been described that allows the regulator to be used in a circuit pack that can be hot plugged into a system without experiencing problems with current surges.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, the number of power supply inputs can be varied for a specific application. Further, the configuration of the auxiliary power supply can also be varied. The soft-start circuit can also be modified such that the last make pins couple to a selected voltage level other than ground potential.

What is claimed is:

1. A voltage regulator, comprising:
   a first voltage-controlled current regulator having a first power input adapted to be coupled to a first power supply;
   at least one additional voltage-controlled current regulator having at least one other power input adapted to be coupled to at least one other power supply;
   the first and the at least one additional voltage-controlled current regulators having first and second current paths, respectively, and a common output node;
   a common error amplifier, responsive to the common output node, and having an output; and
   wherein the output of the error amplifier provides a common feedback signal to the first and the at least one additional voltage-controlled current regulators so as to establish selected currents for the first and the at least one additional voltage-controlled current regulators.

2. The voltage regulator of claim 1, wherein the at least one additional voltage-controlled current regulator comprises one additional voltage-controlled current regulators.

3. The voltage regulator of claim 1, wherein the first voltage-controlled current regulator includes:
   a current sense resistor;
   a transistor;
   wherein the current sense resistor and the transistor are coupled in series between the first power input and the common output node; and
   wherein a gate of the transistor is responsive to the feedback signal from the error amplifier and the voltage drop across the current sense resistor so as to control the current passed by the transistor between the first power input and the common output node.

4. The voltage regulator of claim 3, wherein the first voltage-controlled current regulator further includes:
   a differential amplifier that senses the current drop on the current sense resistor; and
   an operational amplifier, responsive to the differential amplifier and the feedback control signal, and providing a control signal to the gate of the transistor.

5. The voltage regulator of claim 1, wherein the first and the at least one additional voltage-controlled current regulators include first and second transistors coupled in the first and second current paths, respectively, and controlled by the common feedback signal from the error amplifier.

6. The voltage regulator of claim 5, wherein the first and the at least one additional voltage-controlled current regulators include first and second protection diodes coupled in series with the first and second transistors, respectively, so as to prevent current from flowing out the first and at least one other power inputs.

7. The voltage regulator of claim 1, wherein the first and second voltage-controlled current regulators provide substantially the same current to the common output node.

8. The voltage regulator of claim 1, and further including a soft-start circuit that is coupled to the output of the error amplifier so as to control the rate at which the feedback signal changes at start-up, power-on or under external control.

9. The voltage regulator of claim 8, wherein the soft-start circuit includes a last make pin that initiates a ramp-up of the voltage on the feedback signal.

10. The voltage regulator of claim 8, wherein the soft-start circuit includes:
    an operational amplifier with a first input coupled to a reference voltage and a second input coupled to an RC circuit with at least one resistor coupled to a last make pin; and
    a capacitor coupled to the output of the operational amplifier and to the output of the error amplifier.

11. The voltage regulator of claim 10, and further including a diode coupled between the capacitor and the output of the error amplifier to isolate the soft-start circuit when the voltage on the capacitor reaches a selected level.

12. A circuit pack, comprising:
a number of functional signal inputs and outputs;
a functional circuit responsive to the functional signal inputs and providing signals to the functional signal outputs;
a first power input;
at least one additional power inputs; and
a voltage regulator responsive to the first power input and the at least one additional power input, wherein the voltage regulator provides power with balanced current draw from the first and at least one additional power inputs to the functional circuit, the voltage regulator comprising:
  a first voltage-controlled current regulator responsive to the first power input adapted to be coupled to a first power supply;
  at least one additional voltage-controlled current regulator responsive to the at least one additional power input adapted to be coupled to at least one other power supply;
  the first and the at least one additional voltage-controlled current regulators having first and second current paths, respectively, and a common output node;
  a common error amplifier, responsive to the common output node, and having an output; and
  wherein the output of the error amplifier provides a common feedback signal to the first and the at least one additional voltage-controlled current regulators so as to establish selected currents in the first and at least one additional voltage-controlled current regulators.

13. The circuit pack of claim 12, wherein the at least one additional voltagecontrolled current regulator comprises one additional voltage-controlled current regulators.

14. The circuit pack of claim 12, wherein the first voltage-controlled current regulator includes:
a current sense resistor;
a transistor;
wherein the current sense resistor and the transistor are coupled in series between the first power input and the common output node; and
wherein a gate of the transistor is responsive to the feedback signal from the error amplifier and the voltage drop across the current sense resistor so as to control the current passed by the transistor between the first power input and the common output node.

15. The circuit pack of claim 14, wherein the first voltage-controlled current regulator further includes:
a differential amplifier that senses the current drop on the current sense resistor; and
an operational amplifier, responsive to the differential amplifier and the feedback control signal, and providing a control signal to the gate of the transistor.

16. The circuit pack of claim 12, wherein the first and the at least one additional voltage-controlled current regulators include first and second transistors coupled in the first and second current paths, respectively, and controlled by the common feedback signal from the error amplifier.

17. The circuit pack of claim 16, wherein the first and the at least one additional voltage-controlled current regulators include first and second protection diodes coupled in series with the first and second transistors, respectively, so as to prevent current from flowing out the first and at least one other power inputs.

18. The circuit pack of claim 12, wherein the first and second voltage-controlled current regulators provide substantially the same current to the common output node.

19. The circuit pack of claim 12, and further including a soft-start circuit that is coupled to the output of the error amplifier so as to control the rate at which the feedback signal changes at start-up, power-on or under external control.

20. The circuit pack of claim 19, wherein the soft-start circuit includes a last make pin that initiates a ramp-up of the voltage on the feedback signal.

21. The circuit pack of claim 19, wherein the soft-start circuit includes:
an operational amplifier with a first input coupled to a reference voltage and a second input coupled to an RC circuit with at least one resistor coupled to a last make pin; and
a capacitor coupled to the output of the operational amplifier and to the output of the error amplifier.

22. The circuit pack of claim 21, and further including a diode coupled between the capacitor and the output of the error amplifier to isolate the soft-start circuit when the voltage on the capacitor reaches a selected level.

23. A method for balancing current draw from a plurality of power inputs, the method comprising:
sensing the current for a first power input, adapted to be coupled to a first power supply, in a first voltage-controlled current regulator;
sensing the current for at least one additional power input, adapted to be coupled to at least one additional power supply, in at least one additional voltage-controlled current regulator;
monitoring the voltage at a common node for the first and at least one additional voltage-controlled current regulator;
generating a current command signal based on the monitored voltage at the common node; and
providing the current command signal to the first and the additional voltage-controlled current regulators to control the current for each power input based on the current command signal and the sensed current.

24. The method of claim 23, wherein sensing the current for the first power input comprises sensing the voltage drop across a resistor in a current path.

25. The method of claim 23, wherein generating a current command signal comprises generating a current command signal with a common voltage error amplifier.

26. The method of claim 23, and further comprising establishing the current in the first voltage-controlled current regulator using a transistor in a current path of the first voltage-controlled current regulator.

27. The method of claim 23, and further comprising controlling the current command signal with a soft-start circuit.

28. A voltage regulator, comprising:
a plurality of feedback-controlled current paths, each responsive to a power supply input;
the current paths coupled together at a common output node;
a common error amplifier coupled to the common node that compares the voltage at the node with a selected voltage and that generates a control signal for the feedback-controlled current paths such that the common node provides a regulated output voltage with selected current for each of the current paths.

29. The voltage regulator of claim 28, wherein the plurality of feedback-controlled current paths include a plurality of voltage-controlled current regulators.

30. The voltage regulator of claim 29, wherein each voltage-controlled current regulator includes:
- a current sense resistor;
- a transistor;
- wherein the current sense resistor and the transistor are coupled in series between one of the power supply inputs and the common output node; and
- wherein a gate of the transistor is responsive to the control signal from the error amplifier and the voltage drop across the current sense resistor so as to control the current passed by the transistor between the one of the power supply inputs and the common output node.

31. The voltage regulator of claim 28, wherein each of the plurality of feedback controlled current paths provide substantially the same current to the common output node.

32. The voltage regulator of claim 28, and further including a soft-start circuit that is coupled to the output of the error amplifier so as to control the rate at which the control signal changes at start-up, power-on or under external control.

33. The voltage regulator of claim 32, wherein the soft-start circuit includes a last make pin that initiates a ramp-up of the voltage on the control signal.

34. The voltage regulator of claim 32, wherein the soft-start circuit includes:
- an operational amplifier with a first input coupled to a reference voltage and a second input coupled to an RC circuit with at least one resistor coupled to a last make pin; and
- a capacitor coupled to the output of the operational amplifier and to the output of the error amplifier.

* * * * *